April 10, 1951 G. A. LYON 2,547,953
WHEEL COVER
Filed March 18, 1946

Inventor
GEORGE ALBERT LYON
Attys.

Patented Apr. 10, 1951

2,547,953

UNITED STATES PATENT OFFICE 2,547,953

WHEEL COVER

George Albert Lyon, Allenhurst, N. J.

Application March 18, 1946, Serial No. 655,118

9 Claims. (Cl. 301—37)

This invention relates to a wheel cover for an automobile wheel and more particularly to novel retaining means therefor which will add to the ornamental attributes of the cover.

An object of this invention is to provide improved fastening means for an annular wheel cover or trim which is economical to manufacture, and which will lend itself to easy application to existing wheel structures.

Another object of this invention is to provide a wheel cover with retaining means which will utilize the existing wheel openings of a wheel body to advantage in the fastening of a cover to an automobile wheel.

In accordance with the general features of this invention there is provided in a cover structure for a wheel including a multi-flanged tire rim part and a body part having axial wheel openings, a cover for disposition on the side flanges of said rim part comprising an annulus having a turned inner radial margin opposite the wheel openings and retaining means for engagement with the wheel parts in said openings, including means fastened to said margin and projecting into said wheel openings for retaining engagement with at least one of said wheel parts.

Other objects and advantages of this invention will more fully appear from the following detailed description taken in connection with the accompanying drawings which illustrate several embodiments thereof and in which.

As shown on the drawings.

Figure 1:
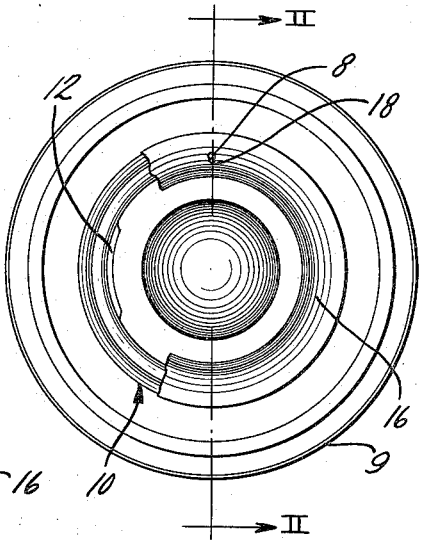
Figure 1 is a side view of a wheel structure embracing the features of this invention, and in which the cover is partly broken away to show the construction of the wheel body.

In the accompanying drawings the reference character 9 designates generally a conventional pneumatic tube and tire assembly mounted in the usual way upon a drop center multi-flanged tire rim 10. This tire rim part is carried in the usual way upon a load-bearing or body part 11, which comprises a dished metallic stamping. The part 11 is attached at spaced intervals to the base flange of the rim part, leaving axial wheel openings 12 through which air can circulate in a manner well known to those familiar with this wheel art.

The central portion of the body part 11 is dished at 13 so as to provide a portion for attachment in a conventional manner to an axle of an automobile vehicle by means of cap screws or bolts (not shown). The central dished portion of the body part 11 has fastened to it a plurality of circumferentially spaced inverted spring clips 14 which may be of any suitable number, such, for example, as three to five. These spring clips 14 detachably hold on the wheel in the usual manner a metallic hub cap 15. This structure is conventional and constitutes no part of the present invention.

My present invention is particularly concerned with a provision of an annular wheel cover 16 and more particularly to novel retaining means for holding the same on the two parts of the wheel. This cover 16 may be made of any suitable sheet material, such as sheet steel although I preferably contemplate making it of a synthetic thermoplastic material, such, for example, as ethyl cellulose, cellulose acetate or vinyl resins.

The cover includes an outer angular leg 17 adapted to overhang an outer edge of the tire rim part 10 in close proximity to the outer side wall of the tire. This annular cover ring 16 extends generally axially and radially inwardly from the turned edge 17 to a position opposite the wheel openings 12. It is generally of a convex-concave cross-sectional contour and is, in reality, a tire simulating portion.

More specifically, this cover 16 is of such radial depth and is of such location relative to the wheel that in use it appears to constitute an extension of the side wall of the tire. This appearance may be accentuated by making the ring with a white external finish in which event it will appear to constitute a white side wall part of the tire. In other words, it gives the appearance of the tire having a white side wall and in which the tire appears to extend clear down to the body part 11 of the wheel.

The ring 16 has an opening 18 through which a valve stem 8 of the tire and tube assembly 9 can project so as to be accessible.

The inner margin of the ring 16 is slightly turned at 19 so as to be fastened to a retaining ring designated generally by the reference character 20. This retaining ring extends radially inwardly of the cover 16 and has a turned inner margin 21 adapted to overhang and bear against the body part 11.

Attached to the retaining ring and comprising integral components thereof are a plurality of spring clips designated generally by the reference character 25, and which correspond in number to the wheel openings 12. These spring clips 25 each include an inclined retaining finger 26 for wedged engagement in a wheel opening 12 between the parts of the wheel. In addition, each spring clip 25 includes a radially outwardly extending flange 27 fastened by means of rivets or bolt means 23 to the ring 20 and to the turned margin 19 of the cover 16.

Attention is directed to the fact that the cover 16 is adapted to seat on a shoulder 22 formed in the ring 20 opposite the wheel openings 12.

From the foregoing it is clear that I have provided a retaining means for the wheel cover 18, which includes a retaining ring 20 provided with a seat for an inner margin 19 of the cover ring and which, in addition, is attached to the spring clips 25, which are in reality integral with the ring 20 and the cover 16.

These spring clips 25 are adapted to be slid axially into the wheel openings 12 so as to have a wedged or biting engagement with at least one of the parts; namely, the base flange of the rim part 10 and to hold the cover ring 16 in tight engagement at 17 with an outer edge of the rim part.

The radially inner margin of the cover ring 17 is bottomed upon the body part 11 at the turned edge 21.

Attention is directed to the fact that this cover structure of my invention constitutes an improvement over that disclosed in my Patent No. 2,368,254, and more particularly constitutes an improvement in the retaining means for holding the plastic ring on the wheel.

The plastic trim ring of this invention has all of the advantages and attributes of that disclosed and claimed broadly in my aforesaid patent.

Figure 3:
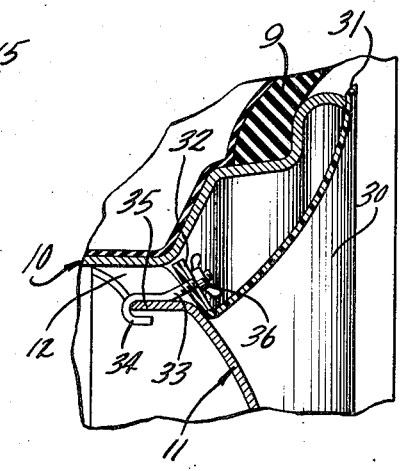
Figure 3 is an enlarged fragmentary cross-sectional view corresponding to Figure 2 showing a modification of the invention.

In Figure 3 I have illustrated a modification of the invention, wherein the same wheel is associated with an annular trim ring 30 having its outer margin 31 bearing upon the rim part 10 of the wheel.

The inner margin 32 of the cover ring 30 is turned generally radially outwardly opposite the wheel openings 12 and is held in retaining cooperation with an edge 35 of the body part 11 of the wheel by means of fastening U-shaped bolts 33. Each of these bolts has a hook portion 34 for hooking over the edge of the part 11 in one of the openings 12 and a wing nut 36 adapted to tightly clamp the margin 32 of the cover ring 30 in position.

It is, of course, clear that the number of bolts 33 used in connection with the cover ring 30 depends upon the number of wheel openings 12. It is usual to employ three to five wheel openings 12 in a wheel.

In the mounting of the wheel cover 30 on the wheel the hook ends of the fastening element 33 are engaged over the edges 35 of the body part and are then tightened in position by means of the wing nut 36.

Access may be had to the wing nut from behind the cover ring 30 due to the fact that the cover ring is made of a resiliently pliable material and can be flexed outwardly in order to afford access to the wing nut. The material from which the cover ring 30 is made is such that the cover ring may be laterally deflected without permanent deformation in order to afford access to the wing nut 36.

Figure 4:
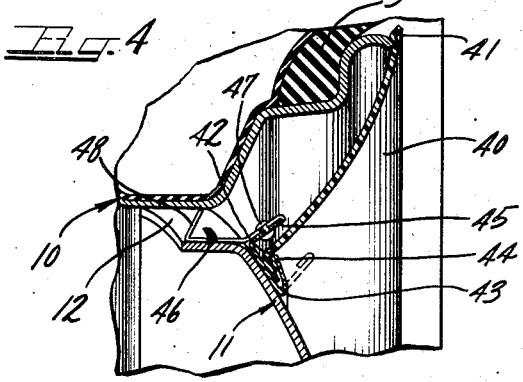
Figure 4 is a fragmentary sectional view showing a still further modification of my invention.

In Figure 4, I have illustrated a still further modification of the invention wherein the cover ring 40 cooperates with the same type of wheel shown in the other figures. This cover ring 40 includes an outer turned edge 41 adapted to overhang an outer edge of the rim part 10 in close proximity to the side wall of the tire.

This ring 40, as in the case of the other forms, may be made of any suitable plastic material. It has an inner turned margin 42 cooperable with a retaining ring 43 having associated with it spring clips 46 projecting into the wheel openings 12. More specifically the annular metal ring 43 has a turned back portion 44 turned back upon the main body of the ring for anchoring in place the inner margin 42 of the plastic ring 40. In addition, the ring 43 has an outer marginal portion 45 behind the ring 40 which is fastened to outer extremities of the spring clips 46 by means of rivets or bolts 47. The outer margin 45 of this ring is disposed opposite the wheel openings and in close proximity to the rear surface of the plastic ring 40.

Any suitable number of spring clips 46 is attached to the rings 40 and 43, and corresponds in number to the wheel openings. Each of these spring clips, as in the previous forms, is adapted to be detachably wedged in the wheel opening for the purpose of holding the wheel cover and ornamental ring on the wheel.

Figure 2:
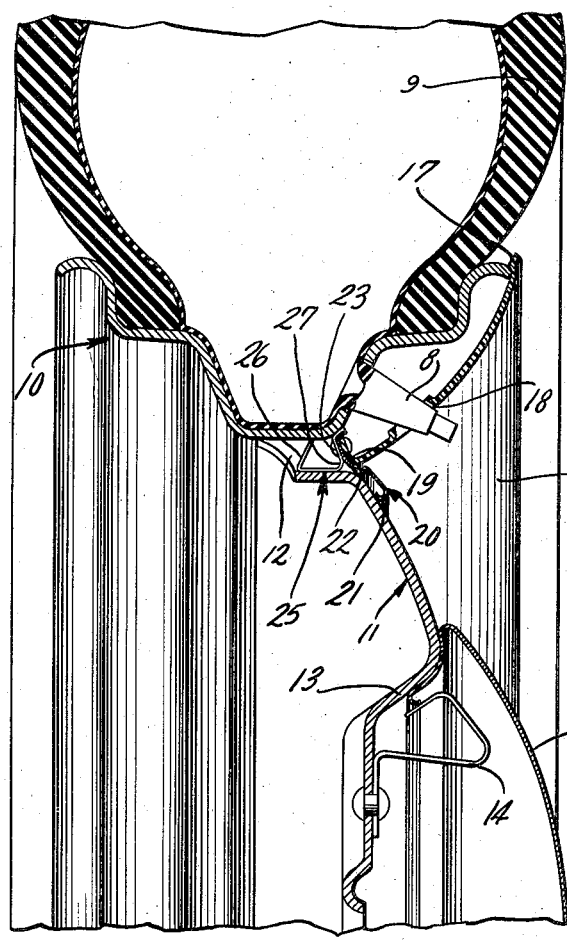
Figure 2 is an enlarged fragmentary cross-sectional view taken on substantially the line II—II of Figure 1 looking in the direction indicated by the arrows.

Attention is directed to the fact that in both Figures 2 and 4 the retaining means can be easily disengaged from fastening cooperation with the wheel parts by the insertion of a screw driver or the like from the rear side of the wheel into the wheel opening. In other words, upon the engagement of the end of a screw driver with the retaining clips in the wheel opening, the retaining fingers can be forced axially outwardly so as to disengage the retaining means from biting engagement with the base flange of the tire rim part.

Thereafter the cover and its retaining means can be disengaged from the wheel. In Figure 3, as distinguished from the other forms, this disengagement is effected by releasing the wing nuts 36 which will enable disengagement of the hook bolts 33 from engagement with the wheel body part.

In all forms the cover constitutes a continuation of the side wall of the tire so that the tire is given the appearance of being much more massive than it is in reality.

In addition, in all forms, the retaining means tends to rigidify or strengthen an inner margin of the annular trim ring, particularly at its point of retention on the wheel.

I claim as my invention:

1. In a cover structure for a wheel including a multi-flanged tire rim part having axial wheel openings, a cover for disposition opposite side flanges of said rim part, comprising an annulus having a turned inner radially disposed margin opposite said wheel openings and retaining means for engagement with the wheel parts in said openings including an element having means fastened to said margin and projecting into a wheel opening for retaining cooperation with one of said wheel parts, said retaining means including a portion turned back upon itself radially inwardly of the cover for defining an ornamental bead for the cover.

2. In a wheel structure including tire rim and load bearing body parts, the body part being formed at the juncture with the tire rim with a plurality of wheel openings, an annular cover assembly including a portion covering the tire rim and the wheel openings and a portion engaging the body part, said last mentioned portion having a flange extending generally radially outwardly behind the covering portion, retaining elements engaging within said wheel openings to retain the cover assembly on the wheel and having the axially outer portions thereof formed to extend in a generally radially outward direction, and means securing said generally radially outwardly extending portions of the retaining elements to said flange.

3. In a wheel structure including tire rim and load bearing body parts, the body part being formed at the juncture with the tire rim with a plurality of wheel openings, an annular cover assembly including a portion covering the tire rim and the wheel openings and a portion engaging the body part, said last mentioned portion having a flange extending generally radially outwardly behind the covering portion, retaining elements engaging within said wheel openings to retain the cover assembly on the wheel and having the axially outer portions thereof formed to extend in a generally radially outward direction, and means securing said generally radially outwardly extending portions of the retaining elements to said flange, said means comprising rivets extending through said portions of the retaining elements and said flange.

4. In a cover structure for a wheel including a tire rim and a body part having wheel openings at the juncture with the tire rim, a cover annulus for concealing the tire rim and the wheel openings and having a generally radially outwardly underturned flange at its inner margin, a ring member affording an ornamental bead at the radially inner side of the cover annulus and a flange extending generally radially outwardly in face to face abutment at the axially inner side of said cover annulus flange, cover retaining clips for engaging within said wheel openings and having the axially outer portions thereof engaging the axially inner side of said radially outwardly projecting flange of the bead member, and elements extending through the superimposed flanges of the cover annulus and the bead member and the retaining element portions and securing the same together as a unitary assembly.

5. In a cover structure for disposition at the outer side of a vehicle wheel including tire rim and body parts wherein the body part has wheel opening formations at the juncture with the tire rim, a cover annulus for covering the outer side of the tire rim and the wheel openings and having a generally radially inwardly extending inner marginal flange, a retaining annulus having a turned over portion providing a reentrant generally radially outwardly opening groove within which said flange is secured and a portion extending generally radially outwardly behind the cover annulus and formed with a generally radially and axially outwardly extending flange, and retaining elements engageable within the wheel openings for retaining the cover on the wheel and having axially outer portions secured to said retaining annulus flange.

6. In combination in a cover of the character described, adapted for disposition at the outer side of a vehicle wheel and comprising a cover annulus for substantially concealing the outer side of a tire rim and wheel openings between the tire rim and load sustaining body of the wheel, said annulus having a generally radially outwardly underturned flange arranged to lie opposite the wheel openings, and means for securing the cover annulus to the wheel including parts extending through said flange for securing the retaining means and the annulus in unitary assembly.

7. In combination in a cover assembly for disposition at the outer side of a vehicle wheel including tire rim and body parts with wheel openings between the parts, a cover annulus for disposition at the outer side of the tire rim and having a generally radially extending flange at its inner margin, a reinforcing ring member assembled with said flange, and means for retaining the cover assembly on the wheel including parts engaging within the wheel openings and parts extending through said ring to secure the retaining means in the assembly.

8. A cover assembly as defined in claim 7 wherein the cover annulus flange and the reinforcing ring are superimposed and the means for securing the retaining means extend not only through the reinforcing ring but also through said flange.

9. A cover according to claim 7 wherein the reinforcing ring is formed with a return bent clamping jaw and the flange of the cover annulus is clamped within said jaw.

GEORGE ALBERT LYON.

REFERENCES CITED

The following references are of record in the file of this patent:

UNITED STATES PATENTS

| Number | Name | Date |
| --- | --- | --- |
| 2,279,331 | Lyon | Apr. 14, 1942 |
| 2,368,244 | Lyon | Jan. 30, 1945 |
| 2,368,246 | Lyon | Jan. 30, 1945 |